United States Patent Office 3,259,656
Patented July 5, 1966

3,259,656
REACTION OF PHOSPHORUS TRICHLORIDE WITH CHLORINATED HYDROCARBON POLYMERS OF LOWER MONO-OLEFINS
William M. Le Suer, Cleveland, Ohio, assignor to The Lubrizol Corporation, Wickliffe, Ohio, a corporation of Ohio
No Drawing. Filed July 29, 1963, Ser. No. 298,438
10 Claims. (Cl. 260—543)

This application is a continuation-in-part of co-pending application Ser. No. 809,623, filed April 29, 1959, now abandoned.

This invention relates to a novel method for the incorporation of phosphorus into organic compounds, and in a more particular sense to a process by which liquid, oil-soluble phosphorus-containing organic compounds are made available for the further preparation of acidic compounds.

It has long been known that the presence of phosphorus in certain oil-soluble organic compounds appears to impart to such compounds certain properties which make them useful as additives in lubricant compositions. Such use may be based upon its ability to provide protection from the ravages of extreme pressure, as in a gear lubricant, or it may act to inhibit corrosion, oxidation, rust, etc. For this reason organic phosphorus compounds have achieved a unique status in the field of lubrication chemistry. They are also used in fuel oils, such as hydrocarbon fuel oils and gasolines to inhibit deterioration of the oil or to disperse the deterioration products so as to prevent the formation of harmful deposits.

Typical examples of such useful phosphorus-containing organic compounds include the products prepared by the reaction of relatively high molecular weight hydrocarbons (M.W. 300–2000) with a phosphorus sulfide. Sulfur may also be included in the reaction mixture, and the resulting product, when subjected to hydrolysis and neutralization with a basic metal compound such as lime, produces a valuable detergent for use in lubricating oils. Such a product acts also to inhibit corrosion. Valuable lubricants additives can also be obtained from the reaction of olefins with phosphorus chlorides in the presence of aluminum chloride.

Still further, the reaction of alcohols with phosphorus pentasulfide produces phosphorodithioic acids and the zinc and barium salts of these are especially well known inhibitors of corrosion and oxidation in a lubricating oil. Still another example of the utility of organic phosphorus compounds has been observed with respect to the reaction product of alcohols and phosphorus trichloride. Such products have been used for many years in gear lubricants in which they are effective in the protection of the gear surfaces from extreme pressure. The reaction of terpenes with phosphorus pentasulfide also provides useful corrosion inhibitors. These latter products are useful as such, and also they may be neutralized with zinc oxide or barium oxide to yield other useful compositions.

It is, therefore, a principal object of this invention to provide novel oil-soluble, phosphorus-containing compositions.

It is a further object of this invention to provide novel compositions which are useful in lubricants.

It is still a further object of this invention to provide a novel process by which such phosphorus-containing organic compositions can be prepared.

It is another object of this invention to provide novel compositions useful as additives in fuels.

It is another object of this invention to provide improved fuel compositions.

It is another object of this invention to provide improved lubricant compositions.

These and other objects are accomplished by the process for the preparation of liquid, oil-soluble phosphorus-containing compositions which comprises heating at a temperature above about 130° C., a mixture of a chlorinated hydrocarbon polymer of a lower mono-olefin containing from about 0.1% to about 20% by weight of chlorine, and from about 0.25 to about 2.0 moles of phosphorus trichloride per atom of chlorine in said polymer, and then contacting the mass with a chlorine reactive compound selected from the class consisting of formaldehyde, organic amides and, hydrocarbon epoxides, to remove a substantial portion of the water-soluble chlorine.

The reactivity of the chlorinated olefin polymer with phosphorus trichloride has not heretofore been realized, particularly in view of the known unreactivity of polyolefins in general with phosphorus halides, and particularly with phosphorus trichloride. Thus, it is a matter of common knowledge that polyisobutylene will not react with phosphorus trichloride under ordinary conditions. The reaction can be made to proceed under certain conditions, ordinarily involving the use of a metal halide catalyst such as aluminum chloride or the presence of an oxidizing agent. But a mixture of these two reactants alone cannot be made to produce a phosphorus-containing product. It was unexpected, therefore, to note a definite chemical reaction between a chlorinated polyisobutylene, for example, and phosphorus trichloride merely upon heating a mixture of these two reactants. It is apparent from these observations that the presence of chlorine in a polyolefin molecule serves to activate that molecule with respect to its susceptibility to reaction with phosphorus trichloride. The nature of this "activation" is not known.

The relative amounts of reactants used in the first step of the process of this invention are related to the reactivity of the chlorine in the polymer chain with the phosphorous trichloride. The amount of phosphorus trichloride used should be within the range of from about 0.25 to 2.0 moles per atom of chlorine in the chlorinated olefin polymer. It is preferred to use an amount of phosphorus trichloride near the upper range of this ratio, although the reason for this is based solely upon economy. A principal purpose of the process is the incorporation of phosphorus into the product, and the chlorine in the polymer chain serves merely to aid in this incorporation of phosphorus. Thus the chlorinated polyolefin ordinarily will contain a minimum amount of chlorine (for reasons of economy) with respect to this function, viz., the incorporation of phosphorus into the product. The apparent maximum effectiveness of the chlorine in serving such purpose is reflected by this upper limit of the ratio of phosphorus trichloride to chlorine, i.e., 2:1. The use of a larger amount of phosphorus trichloride than indicated by this ratio results in a product having no more phosphorus than that obtained by the use of two moles of phosphorus trichloride per atom of chlorine in the polymer chain. Similarly the use of less phosphorus chloride than indicated by this ratio of 2:1, while in no way detrimental to the reaction of the process, indicates the presence in the polymer molecule of more chlorine than is needed to aid in the incorporation of a maximum quantity of phosphorus.

Polyolefins of virtually all molecular weights are usable in the process. That is to say the presence of chlorine in any polyolefin serves to activate the polyolefin with respect to its reactivity with phosphorus trichloride. As a practical matter, however, it has been noted that these polyolefins having molecular weights within the broad range of from about 350 to about 50,000 are most useful. Polyolefins having molecular weight lower than 350 do not seem to be benefited nearly so much by the presence of chlorine in their molecular structure (for the purpose of this invention) as do the higher molecular weight polymers. At the other end of the range of molecular weight it has been noted that chlorinated polyolefins having a molecular weight greater than 50,000, while reactive to produce useful products, are less reactive than the lower molecular weight chlorinated polyolefins and correspondingly less satisfactory for the purposes of this invention.

The olefin polymer from which the chlorinated hydrocarbon polymers of the above-noted process are derived include principally the substantially aliphatic polymers of lower mono-olefins such as ethylene, propene, isobutene, and 1-butene. The polymers also include interpolymers of these lower mono-olefins with a minor amount of aromatic olefins, diolefins, and cyclic olefins provided that at least about 95% by weight of the interpolymers is comprised of the lower mono-olefin units so that the substantially aliphatic character of the polymer is not altered. Examples of polymers include polyisobutene, propenes, polyethylenes, copolymer of 96% of isobutene and 4% of styrene, copolymer of 98% of isobutene and 2% of chloroprene, copolymer of 98% isobutene, 1% of butadiene, and 1% of n-hexaene. Polymers of isobutene are most frequently used because of their ready availability.

The method by which the substantially aliphatic olefin polymers may be chlorinated is not critical. A convenient method comprises passing a stream of chlorine into the olefin polymer at a temperature of 50°–100° C. till the desired amount of chlorine has been incorporated into the polymer molecules. An inert solvent such as carbon tetrachloride, ethylene dichloride, mineral oil, or n-hexene may be used in the chlorination reaction.

The reaction conditions of the first step of the process involve merely mixing the reactants and heating the mixture, usually with agitation, at a temperature in excess of about 130° C. It will be noted that this minimum reaction temperature exceeds that of the boiling point of phosphorus trichloride. For this reason it is necessary to mix the reactants by adding the phosphorus trichloride portionwise to the chlorinated polyolefin, and to provide means for the return of unreacted, volatilized phosphorus trichloride to the reaction mixture. As a practical matter it is preferred to add the phosphorus trichloride through a tube extending beneath the surface of the liquid reaction mixture, thus insuring intimate contact and maximum reaction of the two reactants. Ordinarily the temperature of the reaction mixture is within the range of 150°–225° C. As indicated earlier, the process may be carried out at temperatures as low as about 130° C.; somewhat higher temperatures may be employed, within the limits of the thermal stability of the reactants and product. There seems to be no advantage in carrying the reaction out at temperatures higher than about 250° C., and in this light a practical operating range of temperature for this step of the process may be considered as extending from about 130° C. to about 250° C.

The intermediate product available from the above-described step contains phosphorus and chlorine; much of the chlorine is loosely bonded to the polymeric chain and is quite easily removed. For the purposes of this invention a substantial proportion of such loosely bonded chlorine is removed in the second step of the process. This removal of chlorine is effected by heating with a compound selected from the class consisting of formaldehyde, aliphatic amides having from 2 to 50 carbon atoms and, hydrocarbon epoxides.

The aliphatic carboxy amides which are useful in this step include those having the structural formula

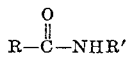

wherein R is an aliphatic hydrocarbon radical having from 1 to 30 carbon atoms, and R' is selected from the class consisting of hydrogen and aliphatic hydrocarbon radicals having from 1 to 15 carbon atoms. Included among the aliphatic carboxy amines which have been found useful are acetamide, n-butyramide, hexanamide, oleamide, N-methylacetamide, N-butyl oleamide, N-cyclohexyl stearamide, and N-methyl stearamide. Mixtures of such aliphatic carboxyl amides are also useful in this step of the procedure. An example of such a commercial mixture consists of 91% oleamide, 6% stearamide, and 3% linoleamide (all percentages by weight).

The hydrocarbon epoxides which are useful in the second step of the process of this invention may be represented by the formula

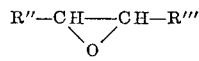

wherein R'' is selected from the class consisting of hydrogen, alkyl radicals, aryl radicals, and cycloalkyl radicals, and R''' is selected from the class consisting of hydrogen and alkyl radicals. Specific examples of such hydrocarbon epoxides which are useful in this step include ethylene oxide, propylene oxide, 2,3-butylene oxide, 1-amylene oxide, styrene oxide, cyclohexene oxide, 1-phenyl-1,2-propylene oxide, and 1-cyclohexyl-1,2-propylene oxide.

Preferably the second step of the process is effected at temperatures of the order of 100°–200° C. For example, the intermediate product may be mixed with the chlorine reactive compound and heated to 150° C. and the reaction mixture maintained at this temperature until all of the unstably bonded chlorine is removed. In most cases one hour of such treatment is sufficient to accomplish this result. The removal of chlorine may alternatively be carried out by adding a chlorine reactive compound to the intermediate which has already been heated to 150° C. For example, the gaseous epoxides are generally added to the intermediate at about 150° C. through a tube which extends beneath the surface of the reaction mixture. Reaction of the intermediate product with chlorine reactive compounds having high boiling points may satisfactorily be carried out at temperatures in the vicinity of 200°–225° C. with no adverse effects.

The product which results from the process of this invention contains an appreciable amount of chlorine ranging from 0.1% upward but the exact structure of the product is unknown. It will be seen that the upper limit of such chlorine content is determined largely by the chlorine content of the chlorinated polymer used as a starting material.

The determination of water-soluble chlorine is made by adding to 3 grams of a sample, about 20 ml. solvent mixture comprising 100 parts of benzene, 99 parts of isopropyl alcohol, and 1 part of water (D974–58T, page 452 of the 1958 ASTM Manual). This mixture of sample and solvent is agitated to insure complete mixing and then extracted with water. The water layer is acidified with nitric acid and titrated with aqueous silver nitrate.

The process of the invention may be illustrated in further detail by the following examples. For the purpose of these examples, the equivalent weight of the chlorinated polymer is that weight containing 1 atomic weight of chlorine.

EXAMPLE 1

A polyisobutene having a molecular weight of 1000 is chlorinated to a chlorine content of 4.3%. To 900 parts of this chlorinated polyisobutene at 110°–188° C. there is added portionwise over a period of 5 hours, 150 parts of phosphorus trichloride. After an additional 2 hours of heating at 195° C., the mixture is freed of volatile components by heating at reduced pressure for an additional 1.5 hours and then blowing with nitrogen for 2 hours. This product is found to have the following analyses: percent phosphorus, 2.0; percent chlorine, 1.9; percent water-soluble chlorine, 1.4.

To 300 parts of this chlorinated polyisobutene-phosphorus trichloride reaction product there is added at room temperature 9.3 parts of propylene oxide. The mixture is then heated with stirring to 83° C. for a period of 1 hour, to 171° C. over a period of 1.5 hours, and finally to 200° C. over a period of 1.3 hours. The latter temperature is maintained for an additional 4 hours whereupon the mixture is heated at 170° C./20 mm. The residue is the desired product and is found to have the following analyses: percent phosphorus, 1.9; percent water-soluble chlorine, 0.03; acid number, 12.

EXAMPLE 2

A mixture of 307 parts of the chlorinated polyisobutene phosphorus trichloride reaction product of Example 1 and 8 parts of formaldehyde (as trioxane) is heated to 190°–202° C. for 1.25 hours. The mixture is then heated at 190° C./18 mm. to remove the volatile components and the residue is the desired product having the following analyses: percent phosphorus, 1.9; percent water-soluble chlorine, 0.04; acid number, 19.

EXAMPLE 3

A polyisobutene having a molecular weight of about 790 is chlorinated to a chlorine content of 4.3%. To 2080 parts of this chlorinated polyisobutene at 180°–200° C. there is added 344 parts of phosphorus trichloride over a period of 6 hours below the surface of the liquid. The unreacted volatile phosphorus trichloride is condensed on a cold finger and returned to the reaction mixture which is maintained at a temperature of 190°–200° C. for 6 hours. The volatile components are then removed by heating at 190° C./30 mm. The residue is the desired product having the following analyses: percent phosphorus, 1.9; percent chlorine, 1.8.

To 2013 parts of this chlorinated polyisobutene-phosphorus trichloride reaction product there is added 54 parts of trioxane at room temperature and the reaction is heated to 190° C. over a period of 3 hours. The mixture is held at this temperature for 5 hours and at 180°–190° C./20 mm. for 1 hour. The residue is filtered and the filtrate is the desired product having the following analyses: percent phosphorus, 1.87; percent water-soluble chlorine, nil; acid number, 32.

EXAMPLE 4

A polyisobutene having a molecular weight of 325 is chlorinated to a chlorine content of 14.0%. To 700 parts (3.2 equivalents) of this chlorinated polyisobutene at 160°–190° C. there is added 110 parts (0.8 mole) of phosphorus trichloride. The phosphorus trichloride is added portionwise throughout a period of 1.5 hours, and is added through a tube extending beneath the surface of the stirred reaction mixture. The resulting mixture is then heated for an additional 10 hours at 180°–210° C., then maintained at 180° C./35 mm. for 0.5 hour. The residue is cooled to 150° C. and blown with ethylene oxide for 1 hour. The reaction mixture is then maintained at 150° C. for an additional hour and at 150° C./20 mm. for 0.5 hour. The residue is filtered and the filtrate is the desired product.

EXAMPLE 5

To 761 parts of a chlorinated polypropene having a molecular weight of 860 and a chlorine content of 5.1%, there is added at 165°–186° C., 133 parts of phosphorus trichloride. The phosphorus trichloride is added portionwise over a period of 2.5 hours and when all has been added, the resulting mixture is heated at 170°–210° C. for 10 hours and then at 170° C./20 mm. for 1 hour. Oleamide (15 parts) is added to the residue which is then heated to 150°–170° C. for 1 hour and at 190°–210° C., for 3.5 hours. The residue is the desired product.

EXAMPLE 6

A high molecular weight (20,000) polyisobutene is chlorinated to a chlorine content of 3.0%. To 780 parts of this product there is added dropwise 138 parts of phosphorus trichloride at 160°–180° C. After all of the phosphorus chloride is added, the mixture is heated for an additional 10 hours at 170°–200° C. The residue is cooled to 150° C. whereupon 70 parts of 2,3-butylene oxide is added. The reaction mixture is maintained at this temperature for 5 hours and then heated at 170° C/30 mm. for 0.5 hour. The residue is the desired product.

EXAMPLE 7

Polyisobutene having a molecular weight of 1000 is chlorinated to a chlorine content of 4.6%. To 2000 parts of this chlorinated polyisobutene at 130°–190° C. there is added portionwise over a period of 15 hours 340 parts of phosphorus trichloride. After an additional 2 hours of heating at 195° C., the mixture is freed of volatile components by heating at reduced pressure for an additional 1.5 hours. The residue is the desired product having the following analyses: percent phosphorus, 1.80; percent chlorine, 2.35.

To 300 parts of this chlorinated polyisobutene-phosphorus trichloride product there is added 50 parts of a commercial fatty acid amide mixture consisting of, by weight, 91% oleamide, 6% stearamide, and 3% linoleamide and the mixture is heated to 190° C. in 2 hours. The reaction temperature is then maintained at 190°–210° C. for 4 hours. The residue is the desired product and is found to have the following analyses: percent phosphorus, 1.61; percent nitrogen, 0.55; percent water-soluble chlorine, 0.09; acid number, 21.

The utility of the process of this invention resides in the preparation of valuable lubricant and fuel oil additives. The products of the process of this invention are particularly useful as additives in lubricating oils and hydrocarbon fuels to improve their rust-inhibiting properties, corrosion-inhibiting properties, and sludge-resistant properties. For the improvement of lubricating oils, especially mineral lubricating oils, generally from about 0.05% to about 10% of the phosphorus-containing compositions of this invention will be employed. A lubricant compound prepared from SAE 20 mineral oil and 0.25% of the product of Example 7, for example, serves as a corrosion-resistant and detergent automobile crankcase oil.

The lubricating oils in which the additive of this invention are useful may be of synthetic, animal, vegetable, or mineral origin. Ordinarily, mineral lubricating oils are preferred for reasons of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally the oils preferred will be fluid oils ranging in viscosity from about 40 Saybolt Universal seconds at 100° F. to about 200 Saybolt Universal seconds at 210° F.

To prepare the final oil compositions, the product of the process of this invention may be added to the oil at the appropriate concentration. Alternatively, a concentrate of the additive may be prepared by dissolving the additive in a limited amount of the oil and the concentrate may then be diluted with additional amounts of the oil to prepare a final oil composition. The lubricating compositions in which the additives of this invention are present, may contain other additives such as supplemental ashless detergents, metal-containing detergents, corrosion inhibitors, rust inhibitors, oxidation inhibitors, load-carrying additives, anti-foam additives, pour point depressants, viscosity index improving agents, additives to improve the frictional characteristics, etc. The concentration of these additives in the lubricating compositions may range from about 0.001% to 20% by weight.

As mentioned previously, the products of the process of this invention are also useful in other compositions, especially hydrocrabon compositions such as gasolines, burner fuel oils, cutting oils, transformer oils, hydraulic fluids, etc. The hydrocarbon compositions for use in gasoline internal combustion engines may contain from about 0.5% to about 5% of the additive while gasolines and burner fuel oils may contain as little as 0.001% or even less. In a liquid hydrocarbon fuel such as leaded gasoline, as little as 0.0001% of the phosphorus-containing composition is effective as a detergent and dispersant. In most applications, it is seldom necessary to employ more than about 1% of the phosphorus compositions of this invention in a hydrocarbon fuel.

The effectiveness of the products obtained by the process of this invention to inhibit the tendency of fuel oil to form sludge is shown by the results of a fuel oil detergent test (Table I). In this test a mixture of 4 liters of a catalytically cracked No. 2 light fuel oil and 15 grams of a synthetic sludge (prepared by homogenizing a 50/40/10, by weight, mixture of distilled water/fuel oil/carbon black) is circulated for 2 hours in a fuel oil burner pump (Model J3BC-100-3, manufactured by Sundstrand Machine Tool Company, Illinois), equipped with a 100-mesh Monel strainer. The sludge retained on the strainer is washed with acetone and weighed. The effectivness of the additive is indicated by the percent reduction of the sludge retained on the strainer as compared to the sludge formed from the fuel oil containing no additive. A fuel whose rating is greater than 90% is considered to have excellent clogging properties.

*Table I*

FUEL OIL DETERGENCY TEST

| Additive | Sludge | |
|---|---|---|
| | Milligrams | Percent Reduction |
| Fuel Oil | 460 | |
| Fuel Oil containing 0.01% of the product of Example 7 | 6.0 | 98.7 |
| Fuel Oil containing 0.01% of the product of Example 3 | 6.0 | 98.7 |

The effectiveness of the products obtained by the process of this invention as dispersants in fuel oil is shown by the results of the carbon black suspension test (Table II). In this test a paste containing 20% by weight of carbon black in a white mineral oil base is prepared by milling the carbon black in oil in a ball mill for 24 hours. For this test, 3 grams of the paste and 70 ml. of additive containing kerosene are placed in a blender and mixed at a low speed for 3 minutes whereupon 0.3 ml. of distilled water is added and the mixing is continued for an additional minute. The suspension is immediately poured into a four-ounce oil sample bottle and stored in an upright position. Tests are run in duplicate.

The bottles containing the sample blend are examined daily with a flashlight. If carbon gradually settles from the upper portion of the bottle, a demarcation line becomes visible. The ratio of the height of this demarcation line to the height of the oil in the bottle is reported as "percent suspended carbon" by visual inspection. Complete suspension of the carbon (no demarcation line) is designated 100%. Complete precipitation of the carbon is designated 0%.

*Table II*

CARBON BLACK SUSPENSION TEST

| Additive at 0.2% chemical | Percent Suspended Carbon | | | |
|---|---|---|---|---|
| | After 1 Day | After 2 Days | After 5 Days | After 7 Days |
| None | 0 | | | |
| | 0 | | | |
| Product of Example 7 | 100 | 100 | 100 | 100 |
| | 100 | 100 | 100 | 100 |
| Product of Example 20 | 100 | 100 | 100 | 100 |
| | 100 | 100 | 100 | 100 |

I therefore particularly point out and distinctly claim as my invention:

1. A process for the preparation of liquid, oil-soluble phosphorus-containing compositions which comprises heating at a temperature above about 130° C., a mixture of a chlorinated hydrocarbon polymer of a lower monoolefin containing from about 0.1% to about 20% by weight of chlorine, and from about 0.25 mole to about 2.0 moles of phosphorus trichloride per atom of chlorine in said polymer, and then contacting the mass with a chlorine reactive compound selected from the class consisting of formaldehyde, aliphatic carboxy amides having from 2 to 50 carbon atoms, and hydrocarbon epoxides at a temperature of from about 80° C. to about 210° C., to remove a substantial portion of the water-soluble chlorine.

2. The process of claim 1 characterized further in that the chlorinated olefin polymer has a molecular weight within the range from about 350 to about 50,000.

3. The process of claim 1 characterized further in that the chlorinated olefin polymer is derived from an olefin having from two to four carbon atoms.

4. The process of claim 1 characterized further in that the chlorine reactive compound is an epoxide having the formula

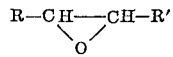

wherein R is selected from the class consisting of hydrogen, alkyl radicals, aryl radicals, and cycloalkyl radicals, and R' is selected from the class consisting of hydrogen and alkyl radicals.

5. The process of claim 4 characterized further in that the organic epoxide is propylene oxide.

6. The process of claim 1 characterized further in that the amide is a carboxy amide having the structural formula

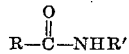

wherein R is an aliphatic hydrocarbon radical having from one to thirty carbon atoms, and R' is selected from the class consisting of hydrogen and aliphatic hydrocarbon radicals having from one to fifteen carbon atoms.

7. The process of claim 6 characterized further in that the carboxy amide is oleamide.

8. A process for the preparation of liquid, oil-soluble phosphorus-containing composition which comprises heating at a temperature above about 130° C., a mixture of a chlorinated hydrocarbon polymer of a lower monoolefin having a molecular weight within the range from about 350 to about 50,000 and containing from about 0.1% to about 20% by weight of chlorine, and from about 0.25 mole to about 2.0 moles of phosphorus trichloride per atom of chlorine in said polymer, and then contacting the mass with formaldehyde at a temperature of from about 80° C. to about 210° C. to remove a substantial portion of the water-soluble chlorine.

9. A process for the preparation of liquid, oil-soluble phosphorus-containing compositions which comprises heating at a temperature above about 130° C., a mixture of a chlorinated olefin hydrocarbon polymer of a lower mono-olefin having a molecular weight within the range of from about 350 to about 50,000 and containing from about 0.1% to about 20% by weight of chlorine, and from about 0.25 mole to about 2.0 moles of phosphorus trichloride per atom of chlorine in said polymer, and then contacting the mass at a temperature of from 80° C. to about 210° C. with an aliphatic carboxy amide having from 2 to 50 carbon atoms to remove a substantial portion of the water-soluble chlorine.

10. The process of claim 9 characterized further in that the chlorinated hydrocarbon polymer is derived from an olefin having from two to four carbon atoms.

References Cited by the Examiner
UNITED STATES PATENTS

| | | | |
|---|---|---|---|
| 2,181,144 | 11/1939 | Morway et al. | 260—94.9 |
| 2,261,757 | 11/1941 | Fawcett | 260—96 |
| 2,262,813 | 11/1941 | Morway et al. | 252—49.9 |
| 2,571,332 | 10/1951 | Brooks | 252—46.7 |
| 2,592,497 | 4/1952 | Waddey et al. | 252—46.7 |
| 2,683,169 | 7/1954 | Jensen et al. | 260—543 |
| 2,685,602 | 8/1954 | Woodstock et al. | 260—543 |

LORRAINE A. WEINBERGER, *Primary Examiner.*

DANIEL E. WYMAN, *Examiner.*

L. G. XIARHOS, B. EISEN, H. C. WEGNER,
*Primary Examiners.*